(12) United States Patent
Pai et al.

(10) Patent No.: US 11,157,046 B2
(45) Date of Patent: Oct. 26, 2021

(54) ELECTRONIC DEVICE

(71) Applicant: Acer Incorporated, New Taipei (TW)

(72) Inventors: Ting-Wen Pai, New Taipei (TW);
Wen-Chieh Tai, New Taipei (TW);
Cheng-Nan Ling, New Taipei (TW);
Chih-Chun Liu, New Taipei (TW);
Yu-Shih Wang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/845,188

(22) Filed: Apr. 10, 2020

(65) Prior Publication Data

US 2021/0055762 A1 Feb. 25, 2021

(30) Foreign Application Priority Data

Aug. 19, 2019 (TW) .................................. 108210955

(51) Int. Cl.
*G06F 3/0354* (2013.01)
*G06F 1/16* (2006.01)

(52) U.S. Cl.
CPC ........ *G06F 1/1679* (2013.01); *G06F 3/03545* (2013.01); *G06F 2200/1632* (2013.01)

(58) Field of Classification Search
CPC ............... G06F 1/1679; G06F 3/03545; G06F 2200/1632
See application file for complete search history.

(56) References Cited

U.S. PATENT DOCUMENTS

| RE39,429 | E | * | 12/2006 | Hawkins | ............... | G06F 1/1615 |
| | | | | | | 708/100 |
| 2006/0133015 | A1 | * | 6/2006 | Lin | ....................... | G06F 1/1613 |
| | | | | | | 361/679.26 |
| 2008/0061565 | A1 | * | 3/2008 | Lee | ......................... | E05C 19/16 |
| | | | | | | 292/251.5 |
| 2008/0123286 | A1 | * | 5/2008 | Watanabe | ............. | G06F 1/1635 |
| | | | | | | 361/679.27 |
| 2021/0037666 | A1 | * | 2/2021 | Kang | .................. | G06F 3/03545 |

* cited by examiner

*Primary Examiner* — Towfiq Elahi
(74) *Attorney, Agent, or Firm* — McClure, Qualey & Rodack, LLP (57) ABSTRACT

An electronic device is provided, including a main body, a cover movably connected to the main body, a biasing element connected to the cover and the main body, a movable member movably disposed on the main body, and a magnetic element disposed on the movable member. When the cover is located in a closed position relative to the main body, the cover is attracted by the magnetic element and restricted in the closed position. When the movable member is pushed by an external force to move from its initial position to a first position, the movable member and the magnetic element separate from the cover, and the biasing element drives the cover to move from the closed position to an open position.

8 Claims, 14 Drawing Sheets

ELECTRONIC DEVICE

CROSS REFERENCE TO RELATED APPLICATIONS

This application claims the benefit of Taiwan Patent Application No. 108210955, filed on Aug. 19, 2019, the entirety of which is incorporated by reference herein.

BACKGROUND OF THE INVENTION

Field of the Invention

The application relates in general to an electronic device, and in particular, to an electronic device that has a stylus received therein.

Description of the Related Art

Figure 1:
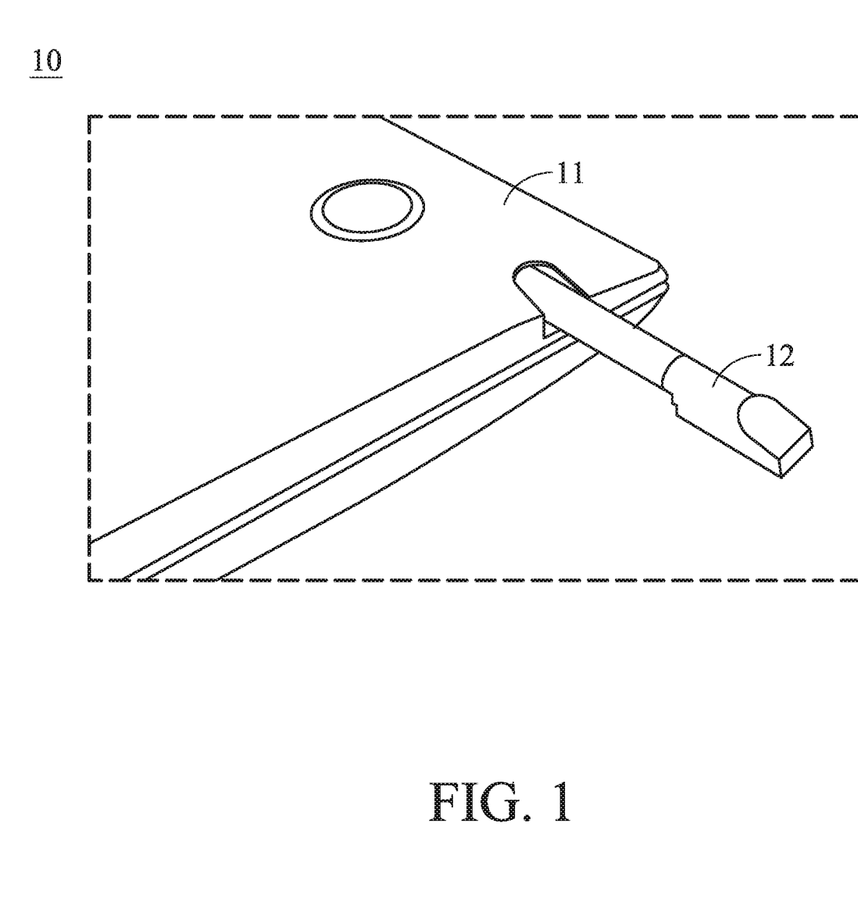
FIG. 1 is a perspective diagram showing a conventional stylus 12 inserted into a slot at the bottom of a laptop computer.

FIG. 1 is a perspective diagram showing a conventional stylus 12 inserted into a slot at the bottom of a laptop computer. As shown in FIG. 1, the slot is formed at the bottom of a conventional laptop computer 10 for receiving the stylus 12. Before using the stylus 12, the user has to take the stylus 12 out of the slot. After the user uses the stylus 12, he or she can insert the stylus 12 back into the slot, whereby the stylus P can be prevented from being lost.

However, it is not comfortable for users to take the stylus 12 out of the slot at the bottom of the laptop computer 10. Additionally, the stylus 12 may be exposed to a lateral side of the laptop computer 10 when it is received in the slot, and this may affect the aesthetic appearance. Moreover, when the stylus 12 is taken out of the slot, dust or external objects may intrude into the slot, since it does not have any dust-proofing mechanism, and this may lead to functional failure of the laptop computer 10.

BRIEF SUMMARY OF INVENTION

In view of the aforementioned problems, an object of the invention is to provide an electronic device that includes a main body, a cover movably connected to the main body, a biasing element connected to the cover and the main body, a movable member movably disposed on the main body, and a magnetic element disposed on the movable member. When the cover is located in a closed position relative to the main body, the cover is attracted by the magnetic element and restricted in the closed position. When the movable member is pushed by an external force to move from its initial position to a first position, the movable member and the magnetic element separate from the cover, and the biasing element drives the cover to move from the closed position to the open position.

In some embodiments, the electronic device further includes a stylus detachably received in a recess of the main body.

In some embodiments, the main body further has a protrusion located in the recess, and the stylus contacts the protrusion when received in the recess.

In some embodiments, the main body further has two depressed portions, and the protrusion is located between the two depressed portions.

In some embodiments, the cover is pivotally connected to the main body.

In some embodiments, the biasing member includes a spring.

In some embodiments, the electronic device further includes a resilient element connected to the main body and the movable member, wherein when the external force is released, the resilient element exerts an elastic force to move the movable member back to the initial position, and the direction of the elastic force is opposite the direction of the external force.

In some embodiments, the movable member has a button portion and an extending portion connected to each other, the button portion is exposed to a surface of the main body, and the magnetic element is disposed on the extending portion, wherein the extending portion faces the cover when the cover is in the closed position.

In some embodiments, the electronic device further includes a display unit pivotally connected to the main body, wherein the display unit is rotatable between a folded position and an unfolded position relative to the main body.

In some embodiments, when the cover is in the open position and the display unit rotates relative to the main body to the folded position, a gap is formed between the cover and the display unit.

In some embodiments, the cover has metal material, and the magnetic element has a magnet.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The embodiments of making and using the electronic device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 2:
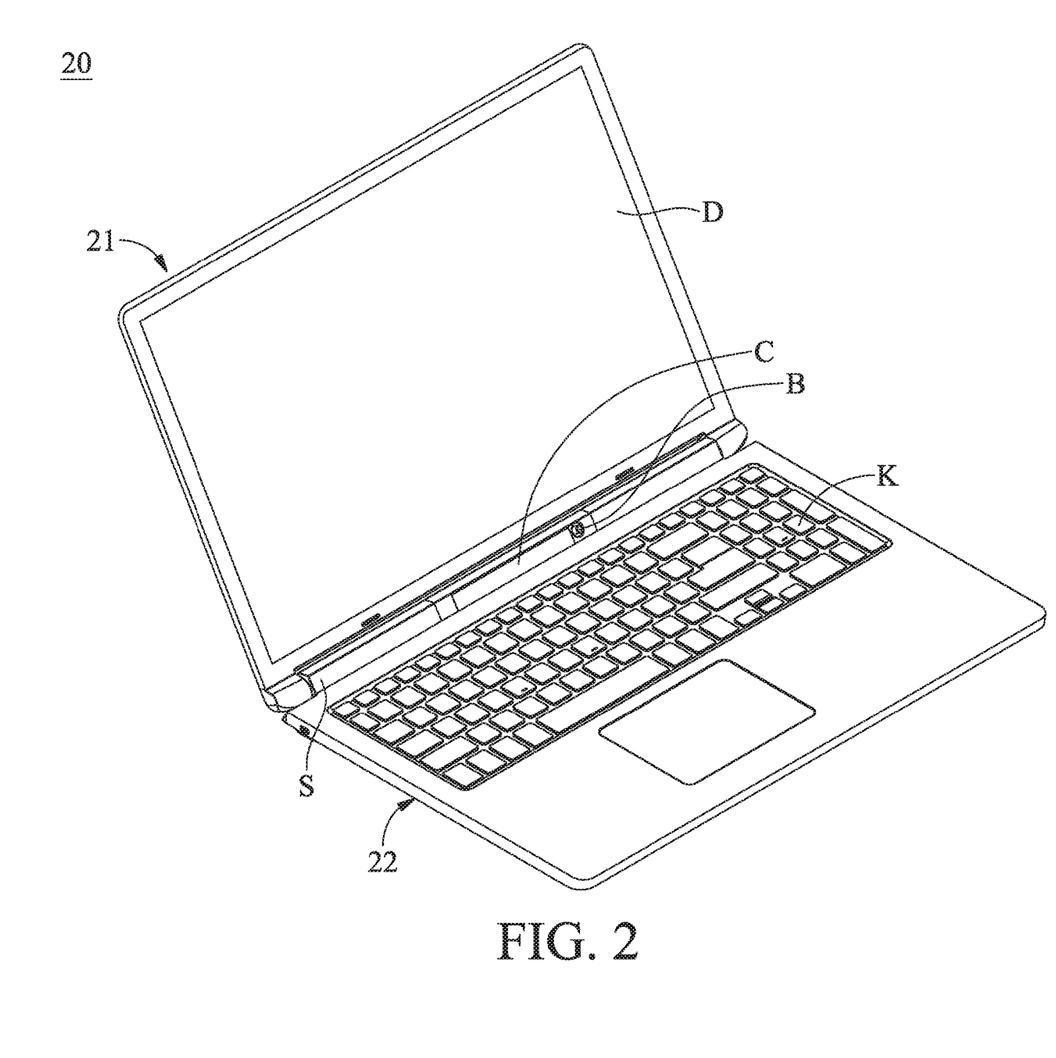
FIG. 2 is a perspective diagram of an electronic device 20 in accordance with an embodiment of the invention.

FIG. 2 is a perspective diagram of an electronic device 20 in accordance with an embodiment of the invention. As shown in FIG. 2, the electronic device 20 may be a laptop computer that primarily comprises a display unit 21 (e.g. LCD) and a main body 22 pivotally connected to each other. The display unit 21 has a display surface D for showing an image. The main body 22 has a keyboard K, so as to facilitate functional operation of the electronic device 20.

It should be noted that a movable member B and a movable cover C are disposed on a surface S of the main body 22. The cover C is used to conceal a stylus in the main body 22. The cover C can be triggered and opens up when the user pushes the movable member B, so that the stylus can be easily picked up by the user.

Figure 3:
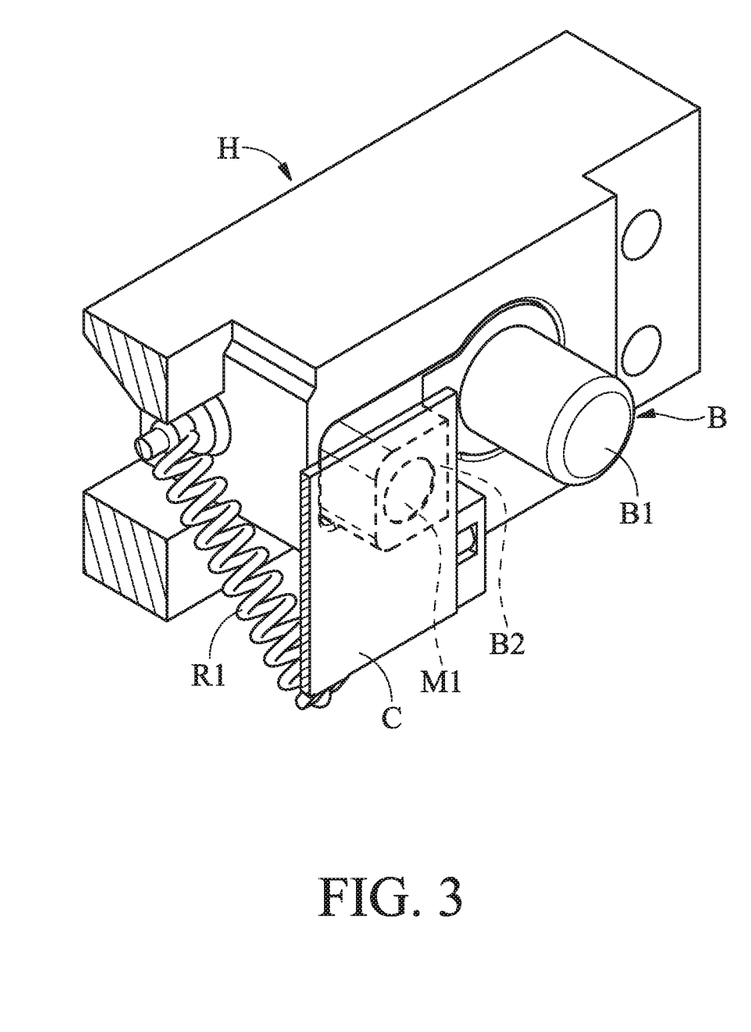
FIG. 3 is a cross-sectional view showing a part of the main body 22 in FIG. 1, wherein the housing of the main body 22 is omitted therefrom.
Figure 4:
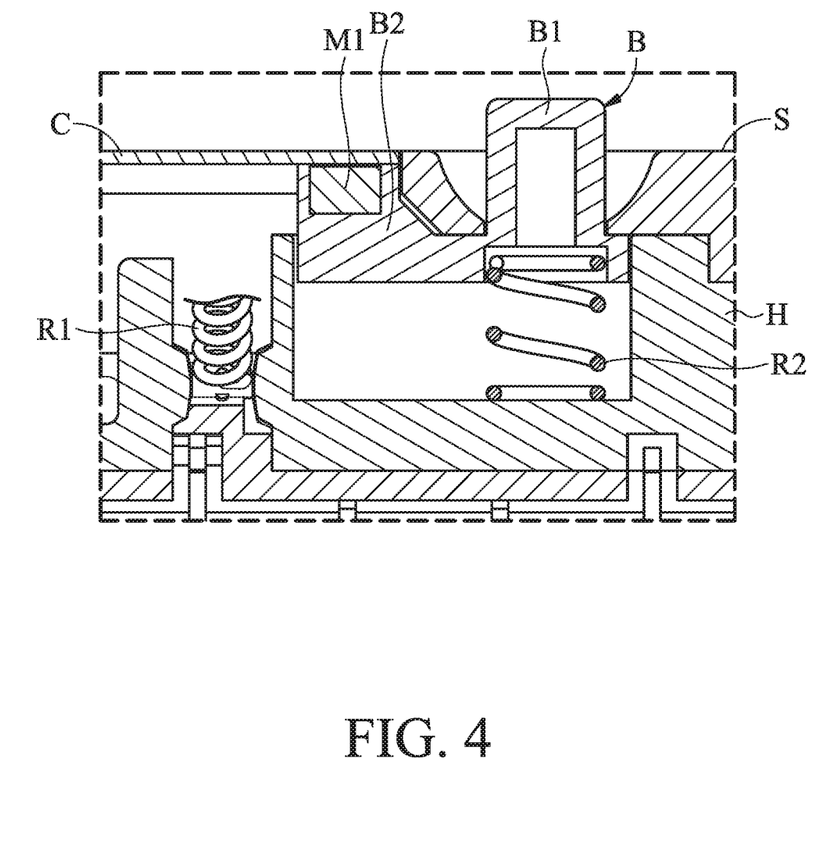
FIG. 4 is another cross-sectional view showing a part of the main body 22 when the housing is not omitted therefrom.

FIG. 3 is a cross-sectional view showing a part of the main body 22 in FIG. 1, wherein the housing of the main body 22 is omitted therefrom. FIG. 4 is another cross-sectional view showing a part of the main body 22 when the housing is not omitted therefrom. Referring to FIGS. 3 and 4, the movable member B and the cover C are movably disposed on a carrier H inside the main body 22. The cover C may comprise metal material and is hinged on the carrier H. Specifically, a biasing element R1 (e.g. extensional spring) is connected to the cover C and the carrier H.

In this embodiment, the movable member B can slide relative to the carrier H, and it has a button portion B1 and an extending portion B2 connected to each other. The button portion B1 is exposed to the surface S of the main body 22 (FIG. 2), and a magnetic element M1 such as magnet is disposed on the extending portion B2 (FIGS. 3 and 4). When the cover C is in a closed position relative to the carrier H, the extending portion B2 of the movable member B and the magnetic element M1 face the cover C. In this state, the cover C and the magnetic element M1 are close to each other, so that an attractive magnetic force is generated therebetween, and the cover C is restricted in the closed position as shown in FIGS. 3 and 4.

Figure 5:
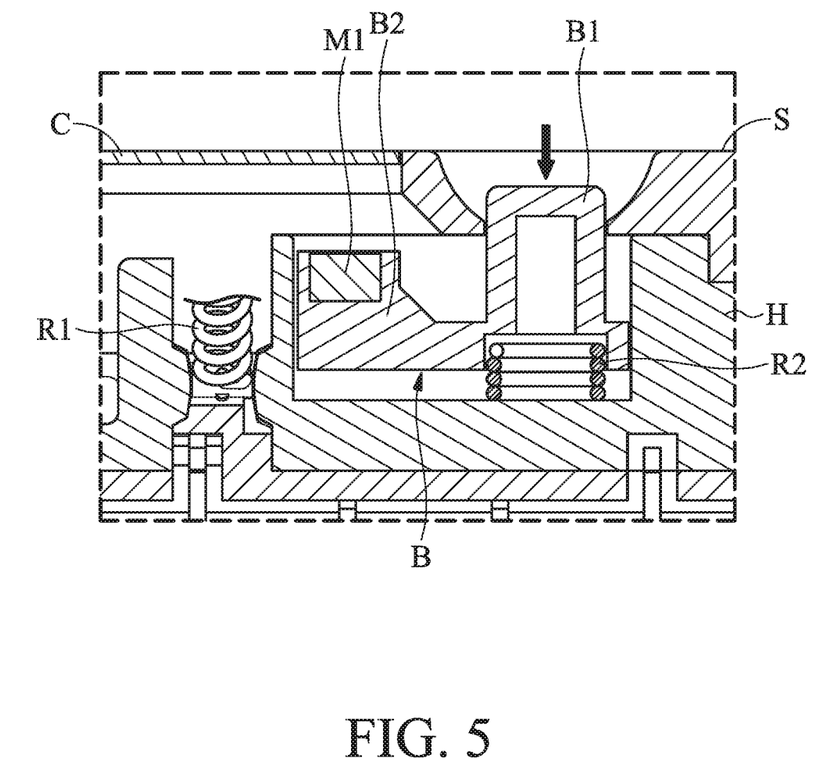
FIG. 5 is cross-sectional view showing a part of the main body 22 when the movable member B in FIG. 4 is pushed by an external force.
Figure 6:
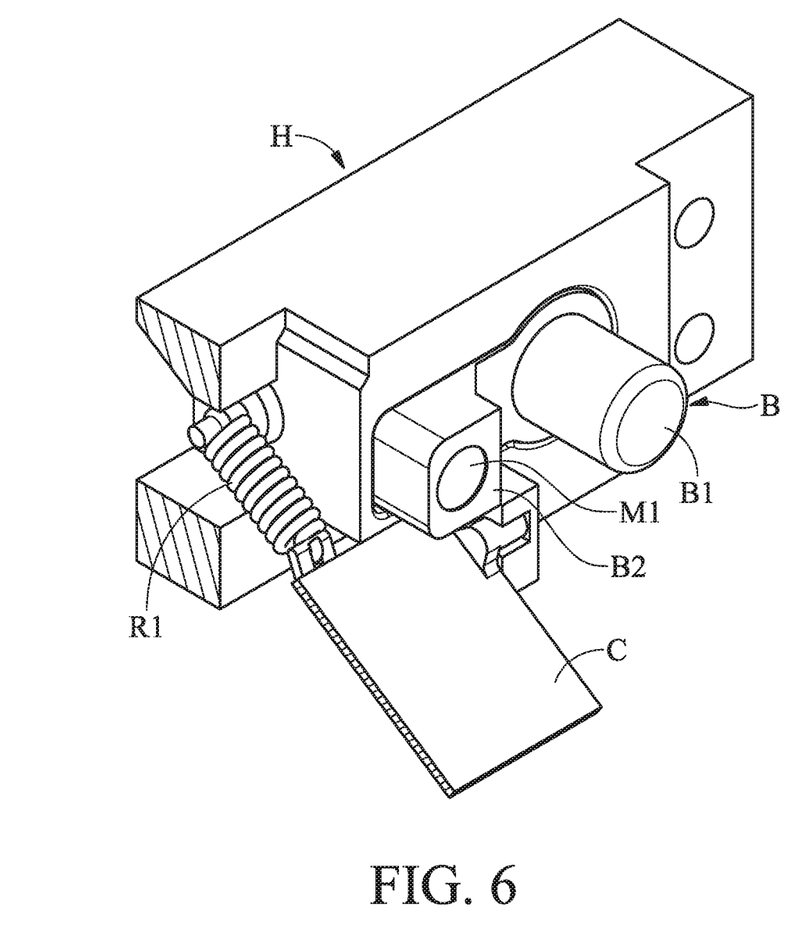
FIG. 6 is a perspective diagram showing the biasing element R1 drives the cover C to move from the closed position to an open position.

FIG. 5 is cross-sectional view showing a part of the main body 22 when the movable member B in FIG. 4 is pushed by an external force. FIG. 6 is a perspective diagram showing the biasing element R1 drives the cover C to move from the closed position to the open position. When the user would like to access the stylus inside the main body 22, he/she can exert an external force to push the button portion B1 of the movable member B, as the arrow indicates in FIG. 5. Therefore, the button portion B1 and the extending portion B2 of the movable member B descend from their initial position (FIGS. 3 and 4) toward the interior of the main body 22 to a first position (FIG. 5), and a resilient element R2 (e.g. compression spring) is pressed between the button portion B1 the carrier H.

In this state, the magnetic element M1 is separated away from the cover C, and the biasing element R1 can exert a biasing force impelling the cover C to rotate relative to the carrier H from the closed position to the open position, as shown in FIG. 6. When the external force is released, the resilient element R2 can exert an elastic force to move the movable member back to the initial position (FIGS. 3 and 4), wherein the direction of the elastic force is opposite the direction of the external force.

Figure 7:
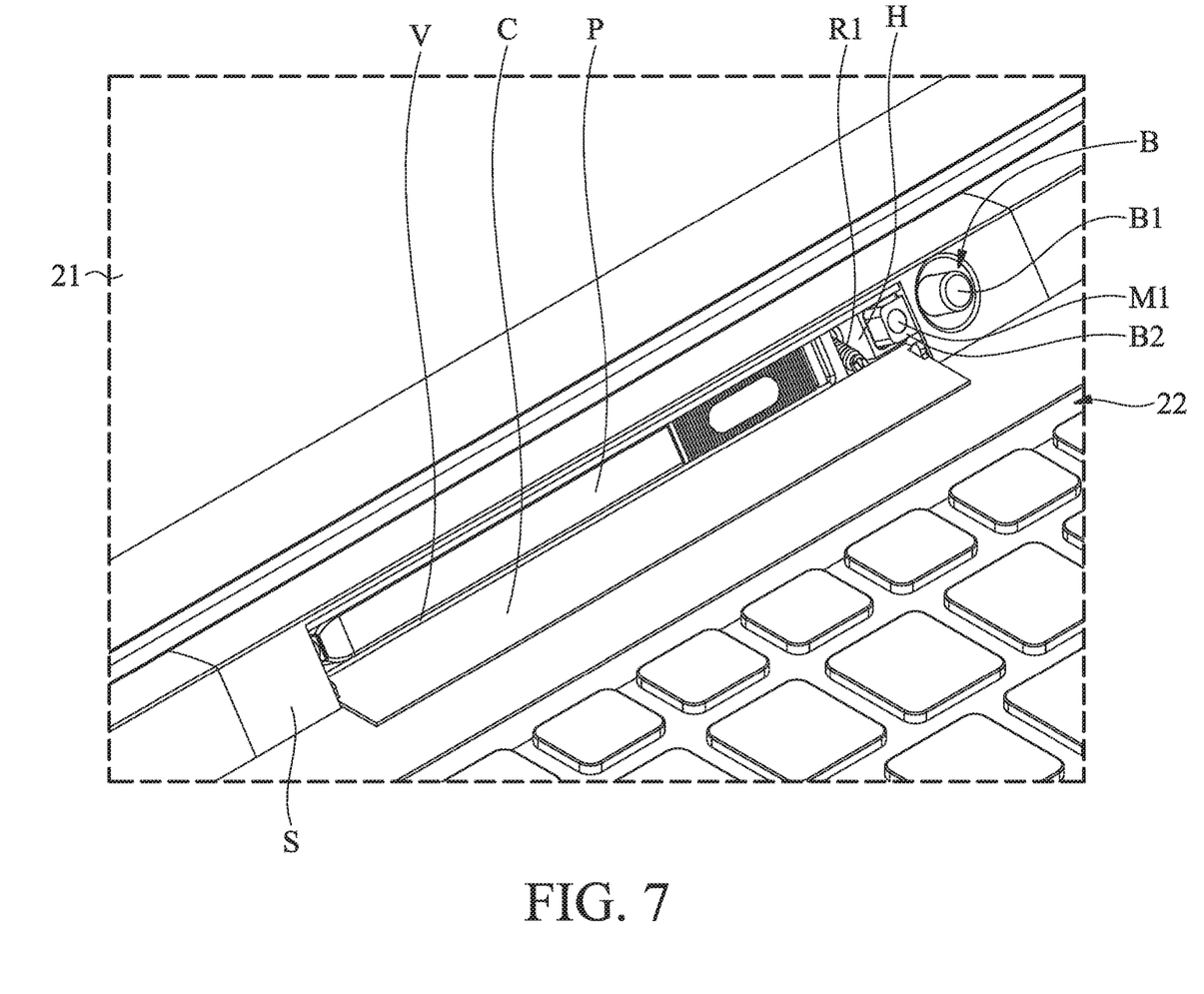
FIG. 7 is an enlarged partial perspective diagram of the electronic device 20 when the cover C rotates from the closed position into the open position.

FIG. 7 is an enlarged partial perspective diagram of the electronic device 20 when the cover C rotates from the closed position to the open position. As shown in FIG. 7, when the user pushes the button B1 of the movable member B so that the cover C rotates to the open position, the stylus P in a recess V of the main body 22 is exposed to the outside, and the user can pick up the stylus P easily. In this embodiment, the recess V is formed on the carrier H.

Figure 8:
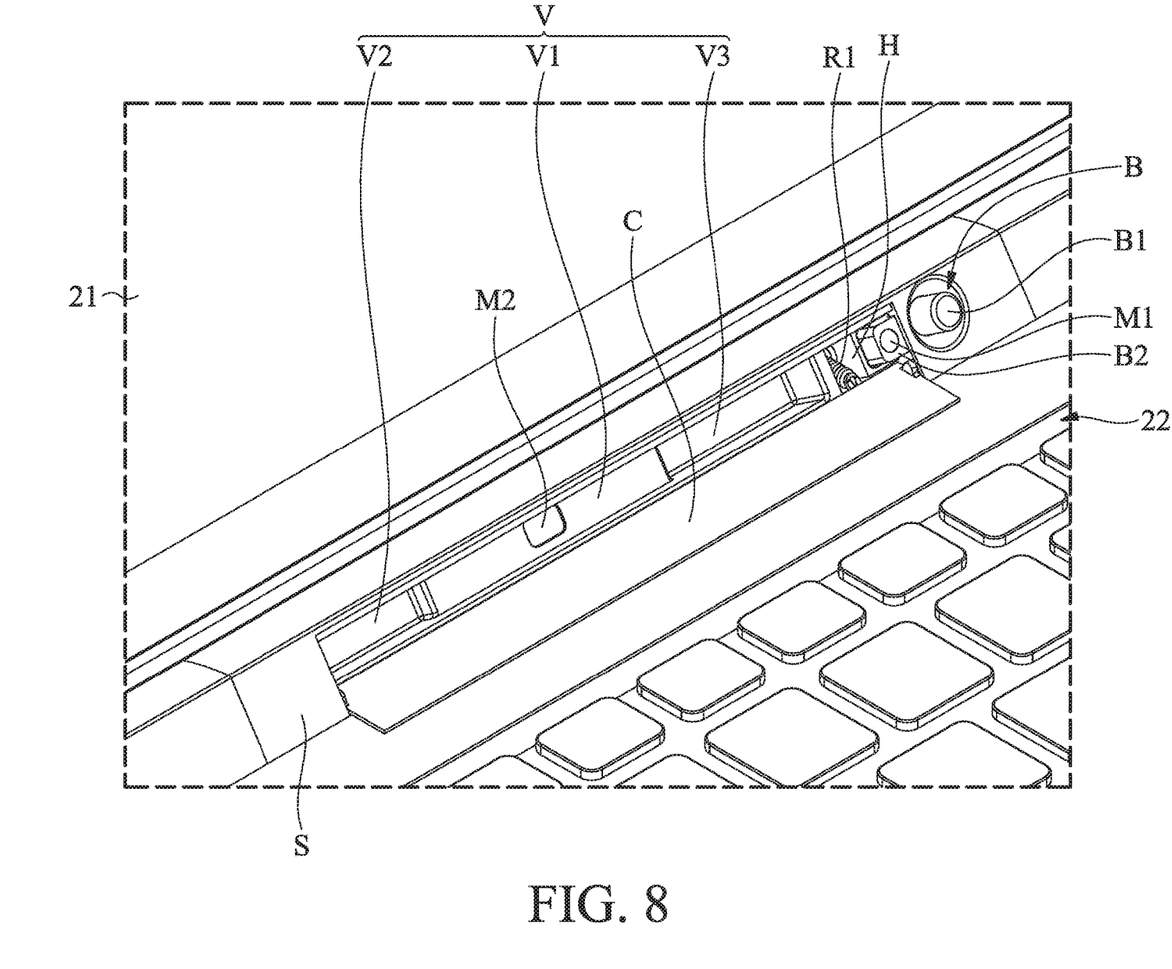
FIG. 8 is another enlarged partial perspective diagram of the electronic device 20 showing the stylus P in FIG. 7 when taken out of the recess V.
Figure 9:
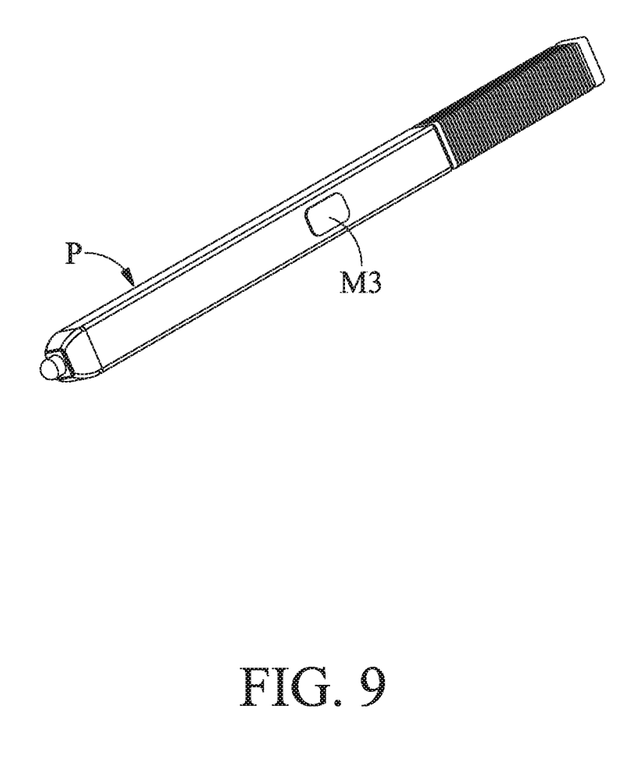
FIG. 9 is a perspective diagram of the stylus P in FIG. 7.

FIG. 8 is another enlarged partial perspective diagram of the electronic device 20 showing the stylus P in FIG. 7 when taken out of the recess V, and FIG. 9 is a perspective diagram of the stylus P in FIG. 7. Referring to FIGS. 8 and 9, the recess V forms a protrusion V1 and two depressed portions V2 and V3, wherein the protrusion V1 is located between the two depressed portions V2 and V3. When the stylus P is received in the recess V, it contacts the protrusion V1, and a magnetic element M2 (e.g. magnet) on the protrusion V1 can attract another magnetic element M3 on the stylus P, whereby the stylus P can be firmly positioned in the recess V.

Figure 10:
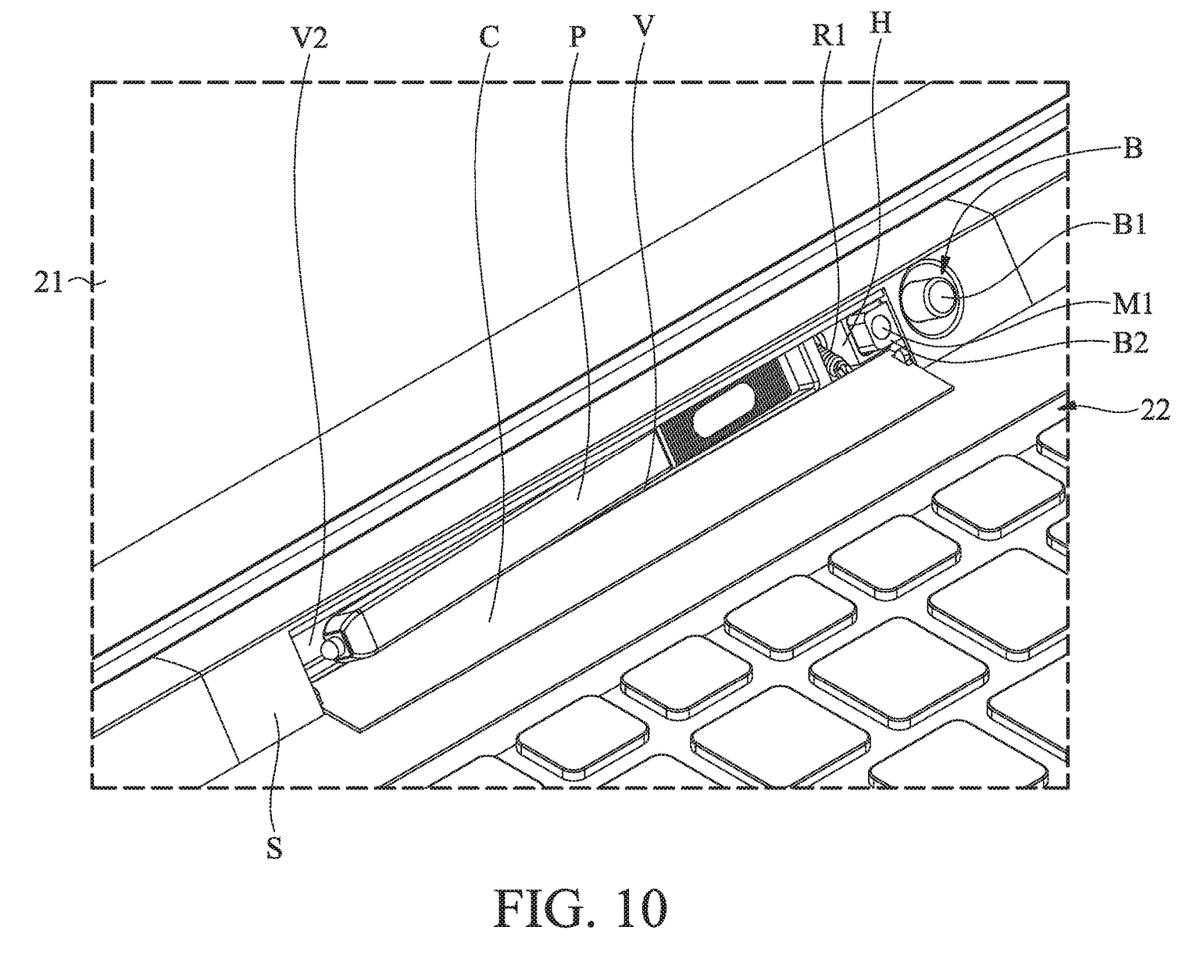
FIG. 10 is an enlarged partial perspective diagram of the electronic device 20 showing the head of the stylus P lifts up when the tail thereof is pushed by the user.
Figure 11:
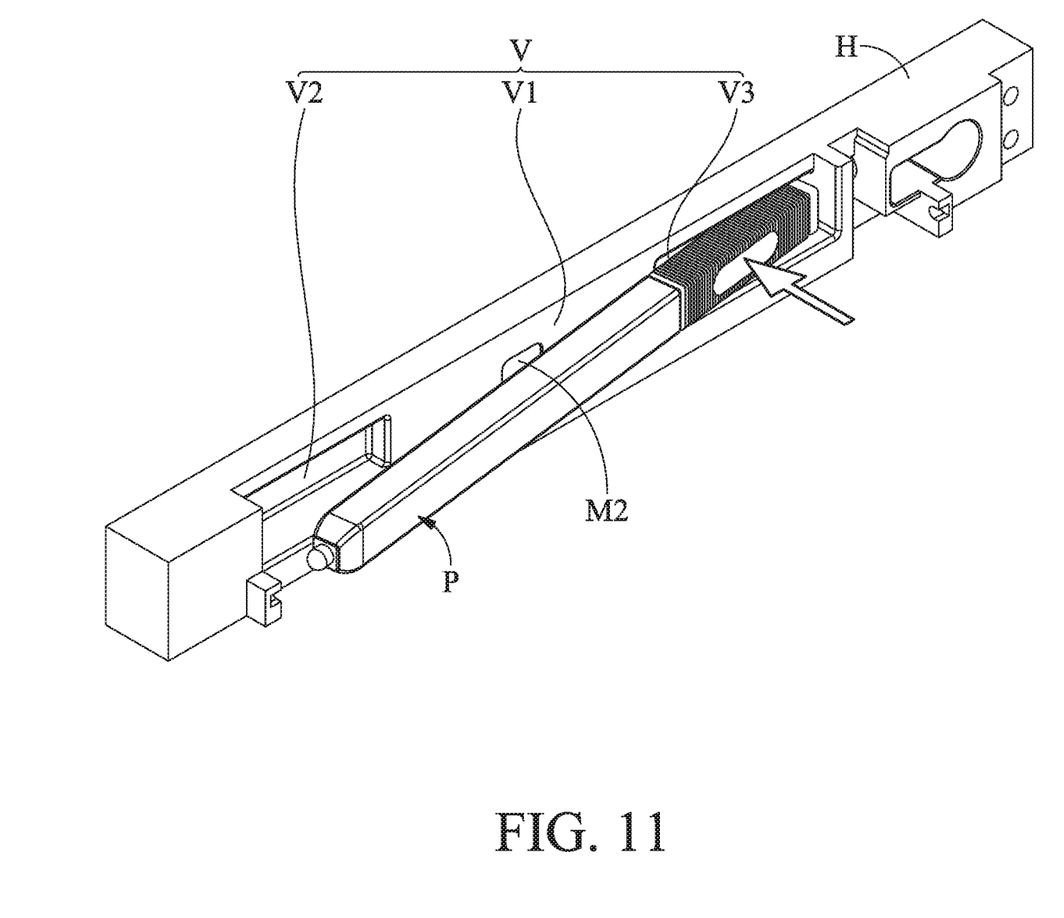
FIG. 11 is a perspective diagram showing the tail of the stylus P sinks toward the bottom of the depressed portion V3.

FIG. 10 is an enlarged partial perspective diagram of the electronic device 20 showing the head of the stylus P lifts up when the tail thereof is pushed by the user. FIG. 11 is a perspective diagram showing the tail of the stylus P sinks toward the bottom of the depressed portion V3. Referring to FIGS. 10 and 11, when the user presses the tail of the stylus P to descend toward the bottom of the depressed portion V3, the stylus P can be easily picked up from the recess V of the main body 22. It should be noted that the protrusion V1 between the two depressed portions V2 and V3 can act as a fulcrum, so that the head of the stylus P lifts up when the user pushes the tail thereof according to the leverage principle.

Figure 12:
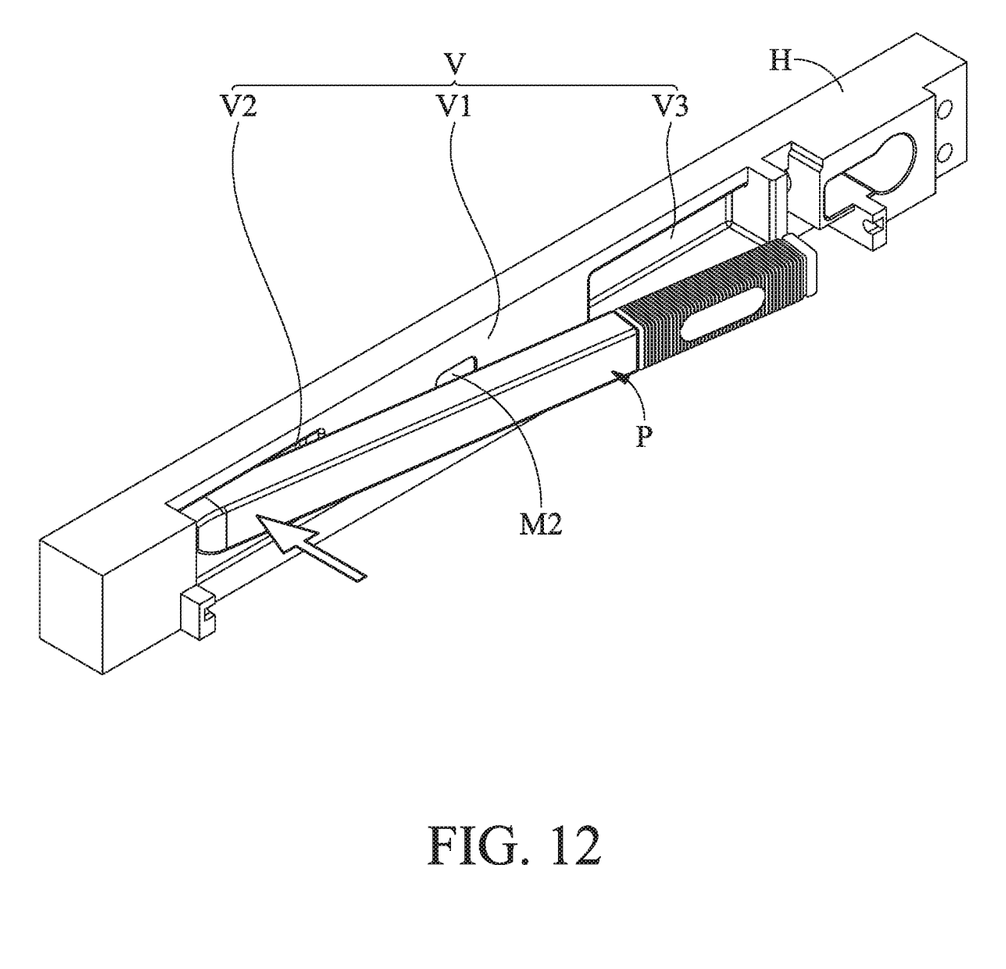
FIG. 12 is a perspective diagram showing the head of the stylus P sinks toward the bottom of the depressed portion V2.

Alternatively, the user may push the head of the stylus P so that the tail of the stylus P sinks toward the bottom of the depressed portion V2, as shown in FIG. 12. In this state, the protrusion V1 between the two depressed portions V2 and V3 can act as a fulcrum, and the tail of the stylus P can lift up when the head thereof is pushed by the user according to the leverage principle. Hence, the stylus P can be easily picked up from the recess V of the main body 22 by the user.

Figure 13:
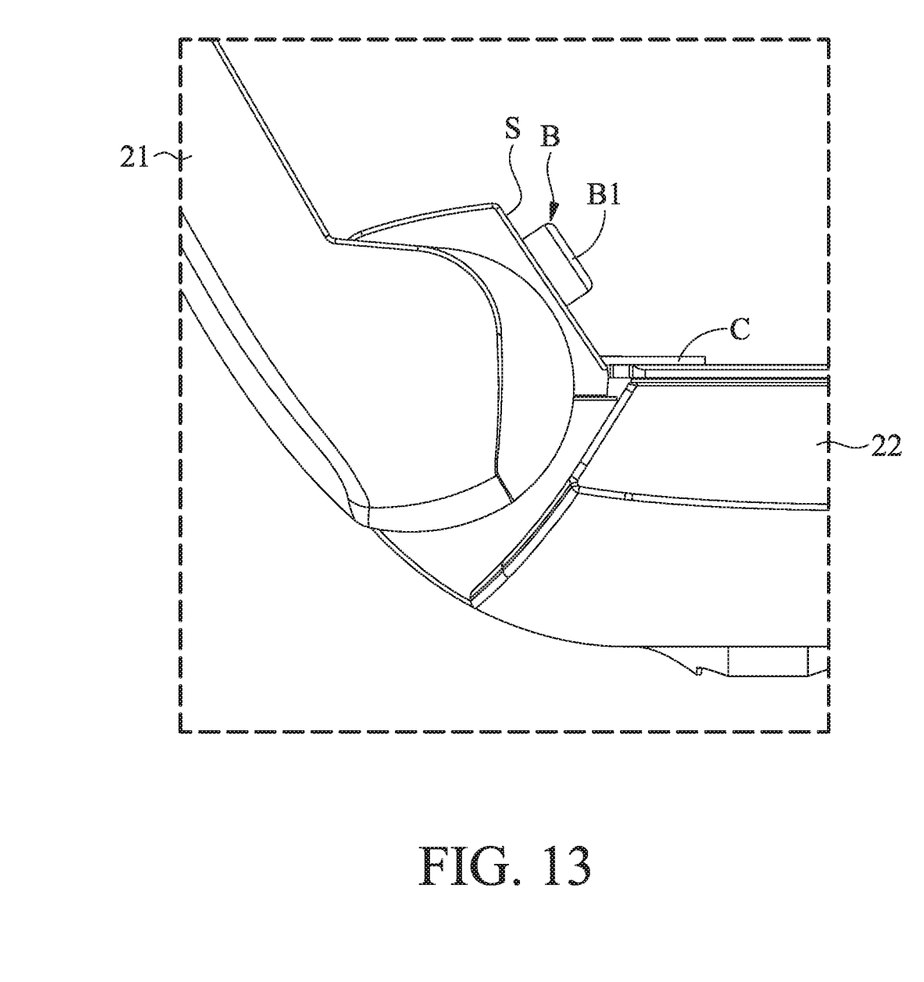
FIG. 13 is an enlarged partial side view of the electronic device 20 showing the display unit 21 when in an unfolded position relative to the main body 22.
Figure 14:
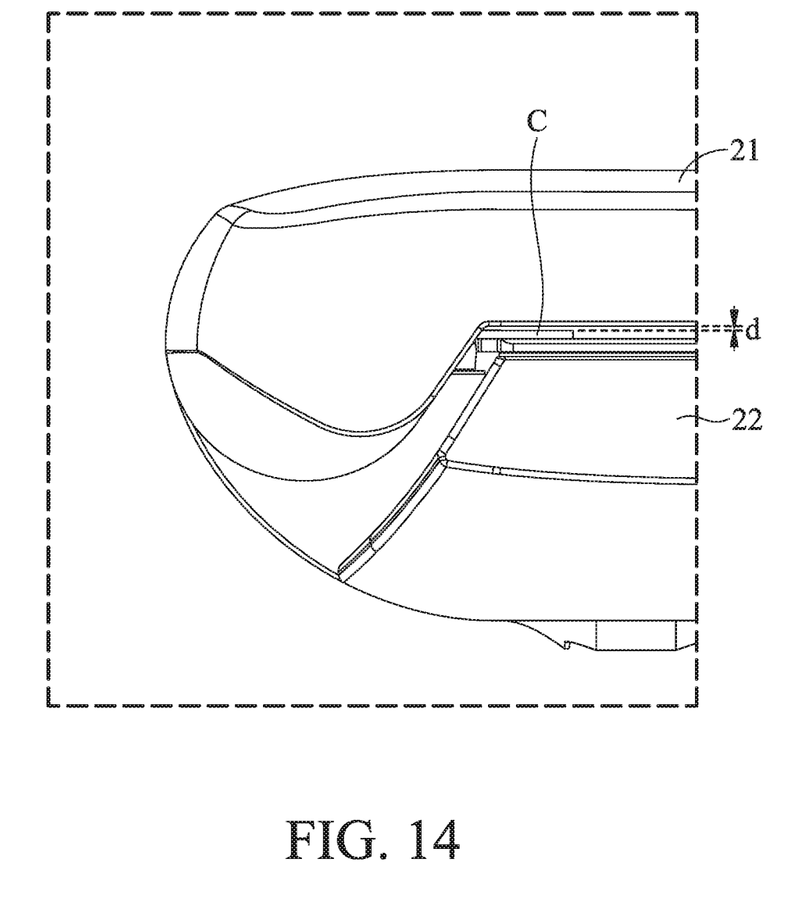
FIG. 14 is an enlarged partial side view of the electronic device 20 showing the display unit 21 when in a folded position relative to the main body 22.

FIG. 13 is an enlarged partial side view of the electronic device 20 showing the display unit 21 when in an unfolded position relative to the main body 22. FIG. 14 is an enlarged partial side view of the electronic device 20 showing the display unit 21 when in a folded position relative to the main body 22. In this embodiment, the display unit 21 is rotatable between a folded position (FIG. 13) and an unfolded position (FIG. 14) relative to the main body 22. When using the electronic device, the user can rotate the display unit 21 relative to the main body 22 to the unfolded position and then push the button B1 of the movable member B, whereby the cover C rotates to the open position, and the stylus P can be easily taken out of the recess V.

When the user finishes using the electronic device, the stylus P can be put back into the recess V, and the cover C can be manually rotated back to the closed position to conceal the stylus P. In some cases, when the user forgets to rotate the cover C back to the closed position, the display unit 21 can still be folded toward the main body 22 (FIG. 14), wherein a gap of distance d is formed between the display unit 21 and the cover C. Hence, mechanical interference can be prevented due to the gap between the display unit 21 and the cover C, thereby facilitating safety and convenience of usage.

In summary, the invention provides an electronic device having a movable member B and a movable cover C disposed on the main body 22, whereby the stylus P can be concealed in the electronic device when not being used. Thus, intrusion of dust or external objects can be prevented, and the stylus P can also be prevented from being lost and separated from the main body 22. Additionally, when using the electronic device, the user can push the button B1 of the movable member B so that the cover C is triggered to rotate to the open position. Thus, the stylus P can be easily taken out of the recess V, whereby convenient usage and aesthetic appearance of the electronic device can be both improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a main body, having a recess;
   a display unit pivotally connected to the main body, wherein the display unit is rotatable between a folded position and an unfolded position relative to the main body;
   a cover, movably connected to the main body;
   a biasing element, connected to the cover and the main body;
   a movable member, movably disposed on the main body; and
   a magnetic element, disposed on the movable member, wherein when the cover is located in a closed position relative to the main body, the cover is attracted by the magnetic element and restricted in the closed position;
   wherein when the movable member is pushed by an external force to move from an initial position to a first position, the movable member and the magnetic element separate from the cover, and the biasing element drives the cover to move from the closed position to an open position;
   wherein when the cover is in the open position and the display unit rotates relative to the main body to the folded position, the display unit is parallel to the main body, the cover is located between the display unit and the main body, and a gap is formed between the cover and the display unit.

2. The electronic device as claimed in claim 1, further comprising a stylus detachably received in the recess.

3. The electronic device as claimed in claim 2, wherein the main body further has a protrusion located in the recess, and the stylus contacts the protrusion when received in the recess.

4. The electronic device as claimed in claim 3, wherein the main body further has two depressed portions, and the protrusion is located between the two depressed portions.

5. The electronic device as claimed in claim 1, wherein the cover is pivotally connected to the main body.

6. The electronic device as claimed in claim 5, wherein the biasing member comprises a spring.

7. The electronic device as claimed in claim 1, further comprising a resilient element connected to the main body and the movable member, wherein when the external force is released, the resilient element exerts an elastic force to move the movable member back to the initial position, and the direction of the elastic force is opposite the direction of the external force.

8. The electronic device as claimed in claim 1, wherein the movable member has a button portion and an extending portion connected to each other, the button portion is exposed to a surface of the main body, and the magnetic element is disposed on the extending portion, wherein the extending portion faces the cover when the cover is in the closed position.

* * * * *